UNITED STATES PATENT OFFICE.

NEWTON E. GLAISTER, OF BOSTON, MASSACHUSETTS.

HOOF-PACKING.

SPECIFICATION forming part of Letters Patent No. 413,621, dated October 22, 1889.

Application filed August 29, 1889. Serial No. 322,358. (No specimens.)

*To all whom it may concern:*

Be it known that I, NEWTON E. GLAISTER, a subject of the Queen of Great Britain, residing at Boston, in the county of Suffolk and Commonwealth of Massachusetts, have invented a new and useful Composition of Matter to be Used as a Packing for Horses' Feet, of which the following is a specification.

My composition consists of the following ingredients, combined in the proportions stated, or in different proportions if a like result may be thereby obtained: peat moss, (ground,) twenty pounds; vaseline, forty pounds; carbolic acid, one pound. These ingredients are to be thoroughly mingled, thus making a thick paste.

This compound may be used under leather under the shoes of heavy horses and packed tightly in the feet of driving-horses while standing in the stable.

Peat moss is softening. Vaseline is soothing. Carbolic acid is cleansing.

By the use of the above composition cracks, warts, dried frog, and other diseases to which horses' feet are subject and liable are prevented and cured.

What I claim, and desire to secure by Letters Patent of the United States, is—

The herein-described composition of matter to be used as a packing or stuffing in, under, or about horses' feet, consisting of peat moss, vaseline, and carbolic acid, substantially in the proportions specified.

NEWTON E. GLAISTER.

Witnesses:
  E. W. ROBERTS,
  M. J. CANAVAN.